J. C. AVARY.
CULTIVATOR.
APPLICATION FILED SEPT. 6, 1910.

1,040,990.

Patented Oct. 15, 1912.

4 SHEETS—SHEET 1.

Fig. 1.

Witnesses
1. S. Austin
William C. Linton

Inventor
James C. Avary

By Joshua R. H. Potts
Attorney

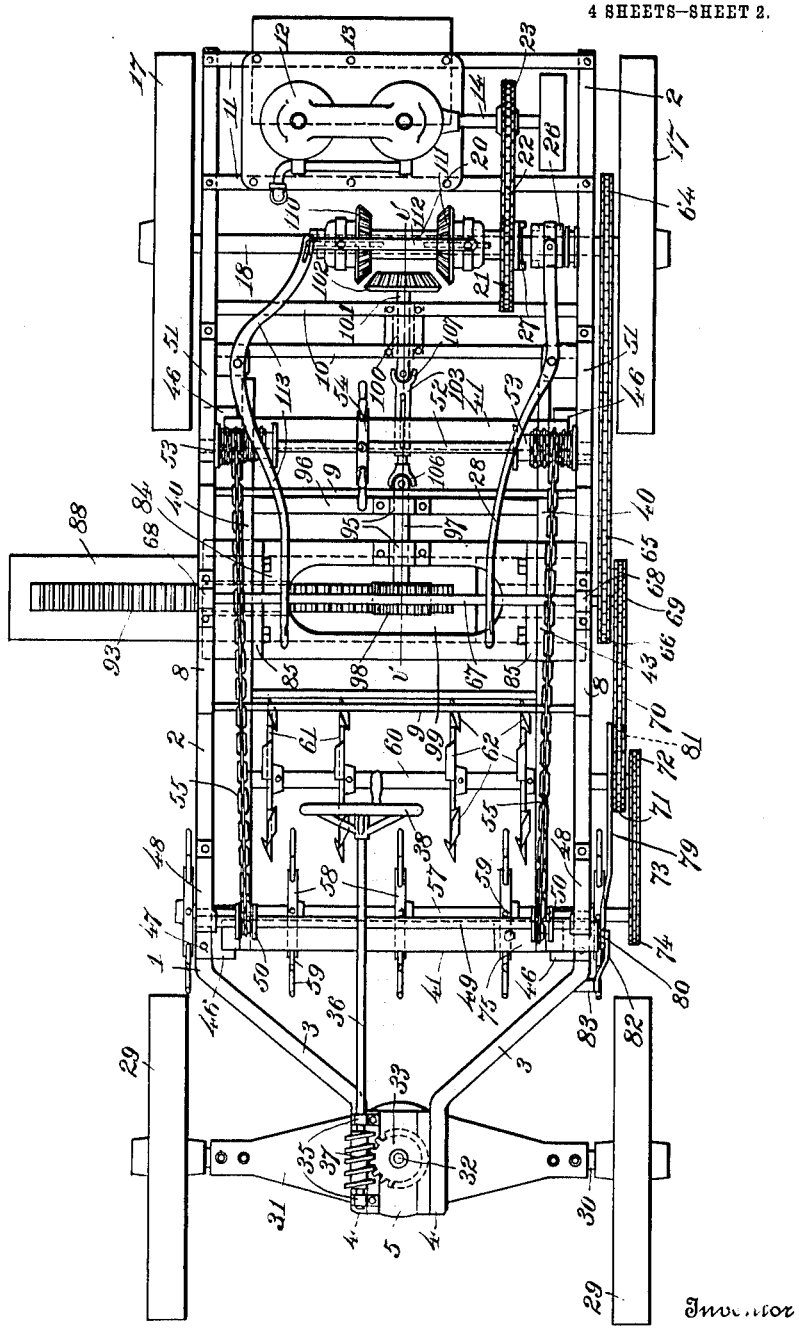

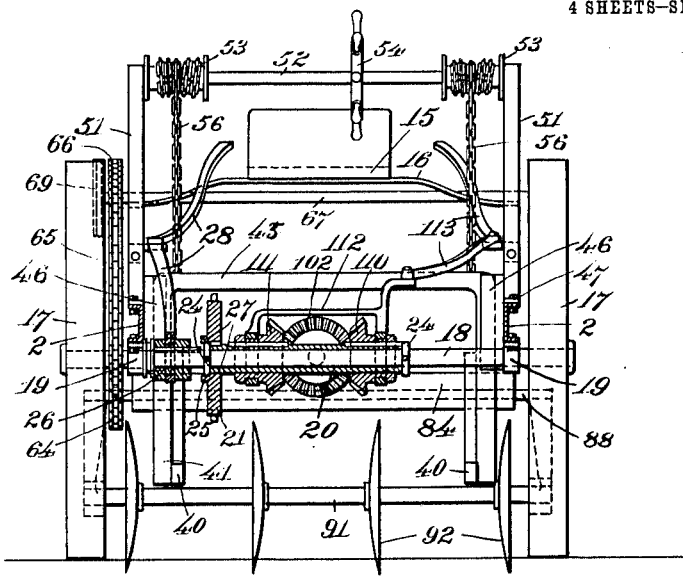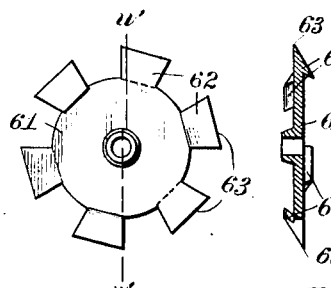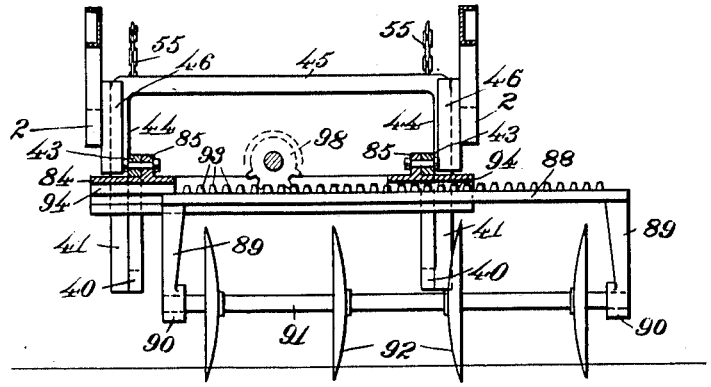

J. C. AVARY.
CULTIVATOR.
APPLICATION FILED SEPT. 6, 1910.
1,040,990.
Patented Oct. 15, 1912.
4 SHEETS—SHEET 4.
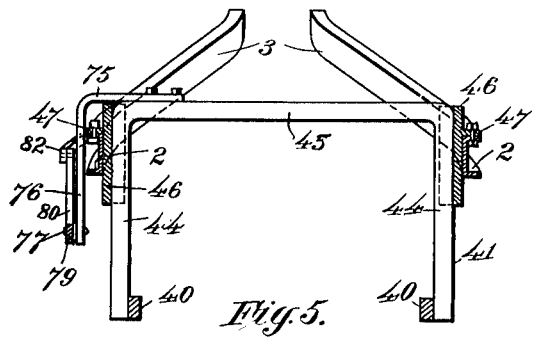
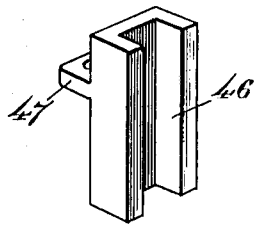
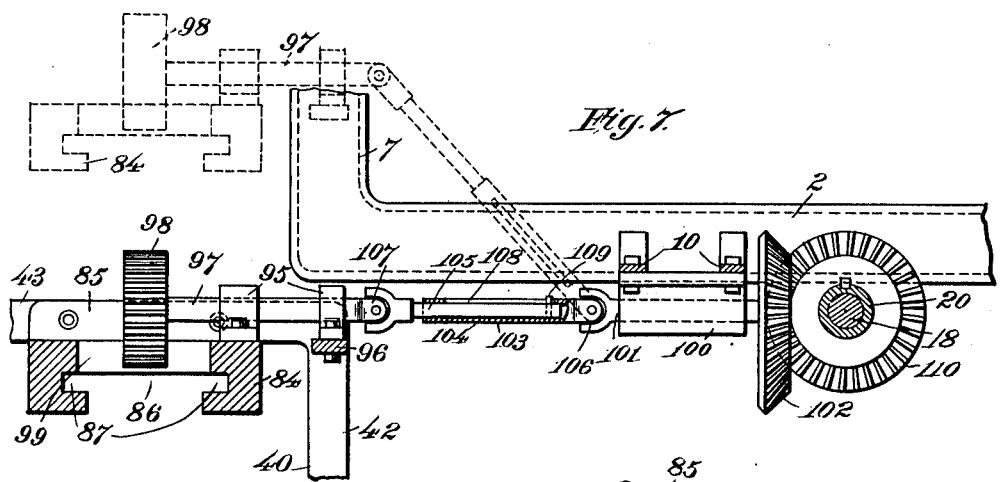
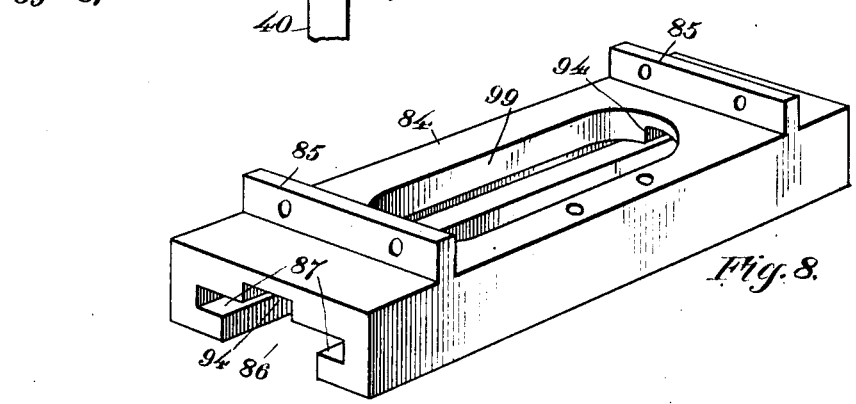
Inventor
James C. Avary
Witnesses
H. S. Austin
William C. Linton
By Joshua R. H. Potts
Attorney

UNITED STATES PATENT OFFICE.

JAMES CORBIN AVARY, OF ATLANTA, GEORGIA.

CULTIVATOR.

1,040,990. Specification of Letters Patent. Patented Oct. 15, 1912.

Application filed September 6, 1910. Serial No. 580,625.

*To all whom it may concern:*

Be it known that I, JAMES C. AVARY, a citizen of the United States, residing at Atlanta, county of Fulton, and State of Georgia, have invented certain new and useful Improvements in Cultivators, of which the following is a specification.

My invention relates to cultivators and particularly to power driven cultivators.

The object of my invention is to provide a cultivator of the class mentioned adapted for use in grading the land and filling in low places or small ravines, as well as for cultivating the land.

A further object of my invention is to provide a device of this character in which the grading and cultivating may be carried on simultaneously.

A further object of my invention is to provide a cultivator equipped with means for thinning out the plants where they are too thick or close together.

A further object of my invention is to provide a device characterized as above mentioned particularly adapted for use in the cotton fields, and to this end to provide a cultivator equipped with means for breaking and loosening the soil, means for uprooting the grass which frequently forms a tough mat over the ground, a series of disks for pulverizing and leveling the ground and when desired a plurality of cultivator shovels or shoes.

A further object of my invention is to provide a device as mentioned with means for moving the disks laterally in either direction to thin out the plants where there is too thick a stand.

A further object of my invention is to provide a device characterized by the above mentioned features and in which the various cultivating members may be readily raised and lowered out of and into engagement with the ground as desired.

Other objects will appear hereinafter.

With these objects in view, my invention consists generally in a cultivator provided with transverse horizontally disposed ways, a carriage slidably mounted in said ways, and provided with a plurality of cultivator disks, a motor, means for connecting and disconnecting the motor and the running gear of the cultivator, and means for connecting the motor to the carriage to move the same laterally in either direction as desired, whereby the cultivator disks may be moved laterally when desired whether the motor is connected to the driving gear or not.

My invention further consists in a cultivator comprising a main frame mounted upon the wheels, a motor, means for connecting the motor to the driving gear and for disconnecting the same therefrom, vertically disposed ways on said main frame, an auxiliary frame provided with guide members slidably mounted in the ways, means for raising and lowering the auxiliary frame, transverse horizontally disposed ways on said auxiliary frame, a carriage slidably mounted in said ways, cultivator disks on said carriage, and means whereby said carriage may be moved in either direction by said motor.

My invention further consists in a cultivator characterized as above mentioned in combination with a flexible connection between the motor on the main frame and the carriage on the auxiliary frame whereby the latter may be raised and lowered as desired without interfering with the connection.

My invention further consists in a cultivator as mentioned having a power driven shaft on the main frame and a shaft on the auxiliary frame provided with cultivating members, a sprocket chain connecting the shafts, means for raising and lowering the auxiliary frame and means for taking up the slack of said chain as the frame is raised.

My invention further consists in the various details of construction and arrangements of parts, all as will be fully described hereinafter, and particularly pointed out in the claims.

My invention will be more readily understood by reference to the accompanying drawings forming a part of this specification, and in which:

Figure 1 is a side elevation of a cultivator embodying my invention in its preferred form, the auxiliary frame being illustrated in raised position in dotted lines, Fig. 2 is a plan view of the same, the driver's seat being omitted to better illustrate the device, Fig. 3 is a vertical transverse section taken on the line x—x of Fig. 1, Fig. 4 is a detail transverse section taken substantially on the line y—y of Fig. 1, Fig. 5 is a similar view taken on the line z—z of Fig. 1, Fig. 6 is a perspective view of one of the vertical ways or guides on the main frame for the auxiliary frame, Fig. 7 is a vertical longitudinal section on substantially the line v—v of Fig. 2, showing the flexible connection between the motor driven shaft on the main frame and the auxiliary frame and illustrated upon an enlarged scale, Fig. 8 is a perspective view of the transverse ways on the auxiliary frame, Fig. 9 is a side elevation of one of the rotary cultivator members, and Fig. 10 is a section on the line w—w of Fig. 9.

Referring now to the drawings, 1 indicates the main frame of the cultivator which comprises a pair of longitudinally disposed members 2—2 which are preferably formed of channel irons. The members 2—2 lie substantially parallel with each other throughout the greater portion of their length but at their forward ends they converge inwardly and upwardly as at 3—3, terminating in parallel forward ends 4—4 which are closer together and in a higher plane than the major portions of the members. A spacing block 5 is secured between the ends 4 by bolts 5. At substantially the center, the members 2 are arched upwardly, the arched portion comprising the vertical portions 7—7 and the horizontal portion 8. The purpose and utility of the arched portions will appear hereinafter. The members 2—2 are rigidly connected by transverse members 9—9, 10—10 and 11—11, the members 9 extending between the portions 8, the members 11 connecting the rear ends of the members 2, and the members 10 being arranged intermediate the arch and the rear end of the frame.

A motor 12 is supported upon the transverse members 11. I have illustrated the motor conventionally as a gasolene engine, 13 indicating the supply tank and 14 the engine shaft.

15 indicates the operator's seat supported upon members 16 extending upwardly from the horizontal portion 8 of the arch.

The rear portion of the main frame 1 is supported upon a pair of traction wheels 17 mounted upon a shaft or axle 18 journaled in bearings 19 secured to the members 2. Rotatably mounted upon the shaft or axle 18 is a sleeve 20 and fixed to one end of the sleeve is a sprocket gear 21 connected by a sprocket chain 22 to a sprocket gear 23 on the engine shaft 14. The sleeve 20 and gear 21 are driven continuously while the engine is running.

24—24 indicate collars fixed to the shaft 18 to prevent longitudinal movement of the sleeve, the gear 21 being recessed as at 25 to receive one of said collars.

Keyed or feathered to the shaft 18, adjacent the sprocket wheel 21 is a clutch member 26 which may be thrown into or out of engagement with clutch members 27 formed on the wheel 21.

28 indicates the operating lever for the clutch which extends forwardly to a point adjacent the seat 15.

It is obvious that the machine may be readily driven or stopped, when the engine is running, by merely throwing the clutch 26 into or out of engagement with the clutch 27.

The forward portion of the main frame is supported upon a pair of guide wheels 29 mounted upon an axle 30 having bearings in a bracket or yoke 31. Fixed to the bracket or yoke 31 is an upwardly extending post 32 swiveled or rotatably mounted in the block 5 and provided at its upper end with a worm gear 33.

34 indicates ball bearing members between the block 5 and the yoke 31.

Mounted in bearings 35 secured to the forward end of the main frame is a shaft 36 provided with a worm 37 meshing with the gear 33. The shaft 36 extends rearwardly to a point in front of the seat 15 where it is provided with a hand wheel 38. It is obvious that by turning the wheel 38 the device may be readily steered or guided.

Mounted for vertical reciprocation on the main frame 1 is an auxiliary frame 39 which comprises a pair of horizontal, longitudinally disposed parallel members 40—40 and a pair of transverse yokes 41 connecting the members 40 at or adjacent their ends. The members 40 are similar in shape to the members 2 but considerably shorter, that is they are formed with arched portions intermediate therein comprising vertical portions 42 and an upper horizontal portion 43. The arched portions of the members 2 and 40 are in transverse alinement. The yokes 41 each comprise parallel vertically disposed sides or ends 44 and a horizontal transverse upper portion 45. The portions 44 are slidably mounted in ways 46 on the main frame members 2 whereby the auxiliary frame may be raised and lowered and yet held firmly in either operative or raised position. The ways 46 each consist of a vertically disposed channel member as illustrated in Fig. 6 and provided with a flange 47 affording means for attaching the same in position. The flange 47 extends from the opposite side of the channel member from the groove or ways formed therein and intermediate the ends preferably nearer the upper end in order that the ways may extend both above and below the members 2 when the flange 47 is secured to the upper edge of said members.

The auxiliary frame is adapted to be frame is a short shaft 97 provided with a spur gear 98 meshing with the rack 93. The upper face of the member 84 is cut away or recessed as at 99 to lessen the weight and to give space for the gear 98.

Mounted in bearings 100 secured to the transverse members 10 of the main frame, is a short shaft 101, the rear end of which is provided with a beveled gear 102.

103 indicates a telescopic shaft formed of the two members 104 and 105 which are connected respectively to the shafts 101 and 97 by universal couplings 106—107 respectively. The member 104 is provided with a longitudinal slot 108 and the member 103 with a key 109 whereby the shaft members are rotatably fixed with relation to each other but longitudinally slidable. By this arrangement a constant, positive and flexible connection is maintained between the gears 102 and 98 which are mounted upon the main and auxiliary frames respectively, and the auxiliary frame allowed free vertical movement without interfering with said connection.

Keyed to the sleeve 20 on the shaft 18, and longitudinally slidable thereon are a pair of beveled gears 110—111 which are adapted to be thrown into engagement with the bevel gear 102 when it is desired to move the carriage 88 laterally. It is obvious that but one of the gears 110 or 111 should engage the gear 102 at a time, and to this end I connect said gears by a yoke 112.

113 indicates a lever connected to the yoke for shifting the gears and which extends to a point adjacent the seat 15. By throwing the gear 110 into engagement with the gear 102 the carriage 88 is moved in one direction and by throwing the other gear 111 into engagement therewith the carriage is moved in the opposite direction.

It should be observed that the disk carriage 88 may be moved laterally of the device when the cultivator is moving forwardly or when it is stopped. When used in the first mentioned way it may be utilized for leveling the ground and filling small ravines, and in the latter way for thinning out plants when desired.

The auxiliary frame is of less width than the main frame but the member 84 is of substantially the same width as the latter, therefore it is necessary to arch the side members 2 to permit raising and lowering of the auxiliary frame and give clearance for the ends of the member 84, and at the same time keep the main frame sufficiently low to give stability to the device.

If desired a number of cultivator shovels 114 may be arranged behind the disks 92.

Having described my invention, what I claim as new and desire to secure by Letters Patent, is:

1. In a device of the class described, a main frame mounted upon wheels, a motor on said main frame, means for connecting said motor to and disconnecting the same from certain of said wheels for driving or stopping the device, an auxiliary frame slidably mounted on said main frame for vertical reciprocation thereon, a carriage on said auxiliary frame and adapted to move transversely thereon in either direction, disks on said carriage, and means for connecting said carriage to said motor to move the former in the direction desired, substantially as described.

2. In a device of the class described, a main frame mounted upon the wheels and comprising a pair of parallel longitudinal side members and a plurality of transverse members rigidly connecting the same, said side members being arched intermediate their ends, an auxiliary frame mounted for vertical reciprocation on said main frame and of less width than said main frame, a transverse member on said auxiliary frame having its ends projecting beneath the arched portion of said main frame, a carriage slidably mounted on said transverse member, disks on said carriage, means for moving said carriage and disks laterally in either direction, and means for raising and lowering said auxiliary frame, substantially as described.

3. In a device of the class described, a main frame mounted upon wheels, said main frame comprising a pair of longitudinal side members and a plurality of transverse members rigidly connecting the same, an auxiliary frame comprising a pair of longitudinal members and a pair of transverse yokes connecting the same, said yokes each consisting of a horizontal upper portion and parallel depending end portions, vertically disposed ways on the side members of the main frame for the depending end portions of said yokes, brackets on said main frame, transverse shafts mounted in said brackets and above said yokes respectively, drums on one of said shafts, pulleys or grooved wheels on the other shaft, flexible members secured to said yokes and to said drums, the flexible members attached to the yoke adjacent said pulleys passing over the same, means for turning the shaft provided with said drums, and cultivator members on said auxiliary frame, substantially as described.

4. In a device of the class described, a main frame mounted upon wheels, a motor on said frame, an auxiliary frame mounted for vertical reciprocation on said main frame, a carriage on said auxiliary frame and adapted to slide transversely of the device in either direction, disks carried by said carriage, means for raising and lowering raised and lowered manually, and to this end I provide the device with means for this purpose operable from the seat 15.

48—48 indicate a pair of brackets fixed to and extending upwardly from the main frame members 2 and provided at their upper ends with bearings for a transverse shaft 49. Secured to the shaft 49 and directly above the ends of the yoke portions 45 of the front yoke are rollers or pulleys 50. Similar brackets 51 are secured to the members 2 adjacent the rear members 46 and are provided at their upper ends with bearings for a transverse shaft 52 upon which are secured drums 53 directly above the ends of the yoke portions 45 of the rear yoke 41. The shaft 52 is directly behind the seat 15 and is provided with a hand wheel 54 for turning the same. A pair of chains 55 are secured to the ends of the forward yoke 41 and passed up over the pulleys 50 and thence to the drums 53 to which they are secured. A pair of similar chains 56 are secured to the ends of the rear yoke 41 and are attached to the drums. It is obvious that by turning the shaft 52 by means of the hand wheel 54 the auxiliary frame will be raised or lowered.

As before stated, this device is particularly adapted for use in the cotton fields where usually, after a rain, the grass quickly grows and forms a tough mat over the ground, and to this end the device is provided with means for breaking and loosening the ground, means for uprooting the grass, and a plurality of disks for pulverizing and leveling the ground. These are all mounted on the auxiliary frame and to them may be added, if desired, a plurality of cultivator shovels. The first two means mentioned are driven by the motor when the machine is in operation while the disks in their ordinary capacity are operated by their contact with the ground.

The means for breaking and loosening the soil is arranged at the forward end of the auxiliary frame and comprises a shaft 57 mounted in bearings on said frame, a plurality of spaced disks on said shaft and a plurality of radially disposed sharpened fingers 59 on each of said disks. The shaft 57 with its disks is rotated rapidly as the machine advances between the rows of the plants and the fingers 59 enter the ground breaking and loosening the same.

The means for uprooting the grass comprises a shaft 60 journaled on the auxiliary frame and provided with a plurality of disks 61 each formed with a plurality of peripheral wedge-shaped hook members 62, the hook portion thereof extending alternately on opposite sides of the disk. The outer edges of the members 62 are preferably straight and sharpened as at 63. The members 62 destroy the grass by chopping the same and by hooking beneath the mat and uprooting the grass from the soil loosened by the fingers 59.

Fixed to the shaft 18 between one of the wheels 17 and the adjacent frame member 2, is a large sprocket wheel 64 which is connected by a chain 65 to a sprocket wheel 66 on a shaft 67 mounted in bearings 68 on the portions 8 of the side frame member and extending under the seat 15. The shaft 67 is also provided with a gear 69 connected by a chain 70 to a sprocket 71 on the shaft 60. The shaft 60 is also provided with a sprocket wheel 72 connected by chains 73 with similar sprocket wheels 74 on the shaft 57.

It is obvious that when the auxiliary frame is raised or lowered, the distance between the sprockets 69 and 71 will be varied, and it is necessary to provide means for taking up the slack of the chain 70 when the auxiliary frame is raised to prevent the chain from accidentally dropping from the sprocket wheels. To this end I provide novel means for automatically taking up the slack at such times.

Fixed to the forward yoke 41 is a bracket 75 which extends across the main frame member and terminates in a downwardly extending arm 76. Pivotally mounted as at 77 on said arm is a bell crank lever 78 comprising a horizontally disposed arm 79 and a vertical arm 80. Upon the end of the arm 79 is a sprocket wheel 81 arranged within and engaging the chain 70. To the end of the arm 80 is pivotally connected a link 82, the opposite end of the link being pivotally connected as at 83 to the main frame. When the auxiliary frame is raised the lever 78 is rocked by the link 82 moving the sprocket wheel 81 to take up the slack in the chain 70 as shown in dotted lines in Fig. 1.

Secured to the horizontal portions 43 of the auxiliary frame members 40 is a transverse member 84. This is preferably formed of a single casting and is provided upon its upper face with parallel flanges 85 for attaching the same to the frame. The member 84 is substantially rectangular and its underface is provided or formed with a longitudinal channel 86, the sides of which are formed with parallel ways 87. Slidably mounted in the channel 86 and upon the ways 87 is a carriage 88 upon the ends of which are formed depending arms 89. The lower ends of the arms 89 are provided with bearings 90 for a transverse shaft 91 upon which are mounted the disks 92. The upper face of the carriage 88 is provided with a rack 93 and the member 84 is provided with the grooves 94 to permit free passage of the rack therethrough.

Mounted in bearings 95 on the member 84 and a transverse member 96 of the auxiliary said auxiliary frame, means for connecting said motor to said carriage for moving the latter and a flexible unit in the same means whereby the auxiliary frame may be raised and lowered without disturbing the connection between the motor and the carriage, substantially as described.

In testimony whereof I have signed my name to this specification in the presence of two subscribing witnesses.

JAMES CORBIN AVARY.

Witnesses:
W. TIM. ALLEN,
H. C. CHAPMAN.